United States Patent
Plota et al.

(10) Patent No.: US 10,621,469 B2
(45) Date of Patent: *Apr. 14, 2020

(54) AUTOMATED PIXEL SHIFTING WITHIN A VIDEO FILE

(71) Applicants: Troy Plota, Kihei, HI (US); Sascha Connelly, Kihei, HI (US)

(72) Inventors: Troy Plota, Kihei, HI (US); Sascha Connelly, Kihei, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,206

(22) Filed: Oct. 16, 2018

(65) Prior Publication Data
US 2019/0050674 A1 Feb. 14, 2019

Related U.S. Application Data

(63) Continuation-in-part of application No. 15/660,677, filed on Jul. 26, 2017.

(60) Provisional application No. 62/574,055, filed on Oct. 18, 2017, provisional application No. 62/514,703,
(Continued)

(51) Int. Cl.
| | |
|---|---|
| *G09G 5/00* | (2006.01) |
| *G06K 9/62* | (2006.01) |
| *G06K 9/00* | (2006.01) |
| *G09G 3/00* | (2006.01) |
| *G06F 3/0484* | (2013.01) |
| *G06T 11/00* | (2006.01) |
| *G11B 27/34* | (2006.01) |

(52) U.S. Cl.
CPC ....... *G06K 9/6203* (2013.01); *G06F 3/04842* (2013.01); *G06F 3/04845* (2013.01); *G06K 9/00744* (2013.01); *G06T 11/00* (2013.01); *G09G 3/007* (2013.01); *G11B 27/34* (2013.01)

(58) Field of Classification Search
CPC ......... G06T 11/60; G06T 19/00; G06T 11/00; G06F 9/4443; G06F 3/0481
USPC ....................................................... 345/619
See application file for complete search history.

(56) References Cited

U.S. PATENT DOCUMENTS

| | | |
|---|---|---|
| 2007/0019007 A1 | 1/2007 | Jung |
| 2009/0189912 A1* | 7/2009 | Holtman .............. H04N 7/0112 345/606 |
| 2010/0134505 A1 | 6/2010 | Andersen |
(Continued)

OTHER PUBLICATIONS

SCICompanion, Palette Cycling, Mar. 6, 2016. [Online], Retrieved on Sep. 21, 2018, Retrieved from <URL: http://scicompanion.com/Documentation/palettecycling.html> (Year: 2016).*

(Continued)

*Primary Examiner* — Gordon G Liu
(74) *Attorney, Agent, or Firm* — Workman Nydegger

(57) ABSTRACT

A computer system for automating the shifting of pixels within a digital video receives a first starting point through a user interface. The first starting point is received through a user selection of a first beginning portion of a video frame. The system then receives a first ending point through the user interface. The first ending point is received through a user selection of a first ending portion of the user interface. The system selects a first set of pixels that lie between the first starting point and the first ending point. The system then shifts the first set of pixels in the first direction, wherein shifting the first set of pixels comprises rendering and re-rendering in a loop the first set of pixels being shifted.

20 Claims, 11 Drawing Sheets

Related U.S. Application Data filed on Jun. 2, 2017, provisional application No. 62/368,017, filed on Jul. 28, 2016.

(56) References Cited

U.S. PATENT DOCUMENTS

| | | |
|---|---|---|
| 2011/0273583 A1 | 11/2011 | Yoshino et al. |
| 2015/0022518 A1 | 1/2015 | Takeshita |
| 2015/0095882 A1 | 4/2015 | Jaeger et al. |
| 2015/0262327 A1* | 9/2015 | Ohta .................... G06T 3/0093 345/646 |
| 2017/0140514 A1* | 5/2017 | Amirghodsi .............. G06T 5/50 |

OTHER PUBLICATIONS

U.S. Appl. No. 16/102,055, Jan. 18, 2019, Final Office Action.
U.S. Appl. No. 16/102,055, filed Aug. 13, 2018, Plota et al.
International Search Report and Writted Opinion for application No. PCT/US2017/044256 dated Oct. 6, 2017.
U.S. Appl. No. 15/660,677, Sep. 26, 2018, Office Action.
U.S. Appl. No. 16/102,055, Oct. 2, 2018, Office Action.
U.S. Appl. No. 15/660,677, Oct. 2, 2019, Notice of Allowance.
U.S. Appl. No. 16/102,055, Apr. 17, 2019, Notice of Allowance.
U.S. Appl. No. 15/660,677, May 6, 2019, Final Office Action.

* cited by examiner

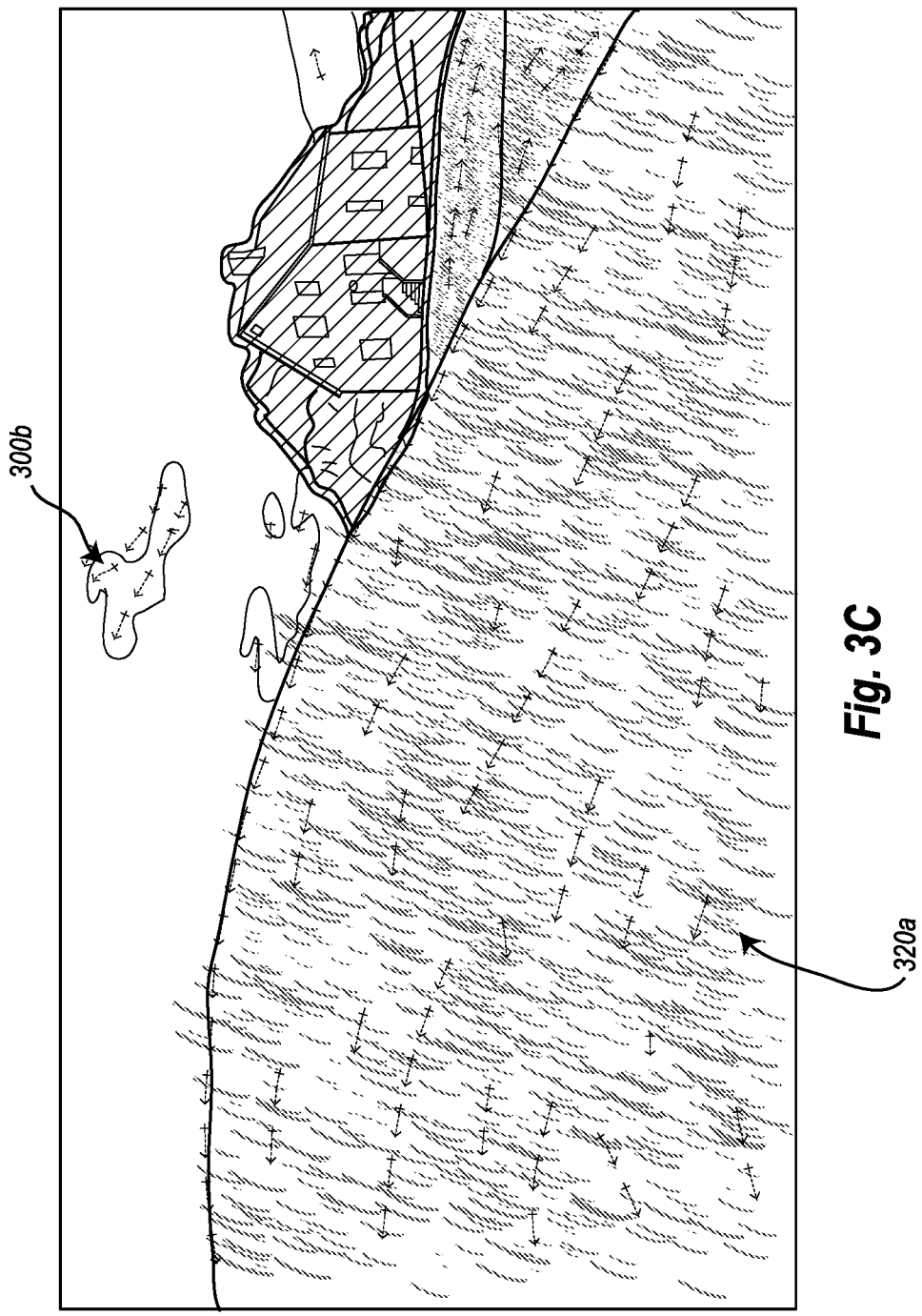

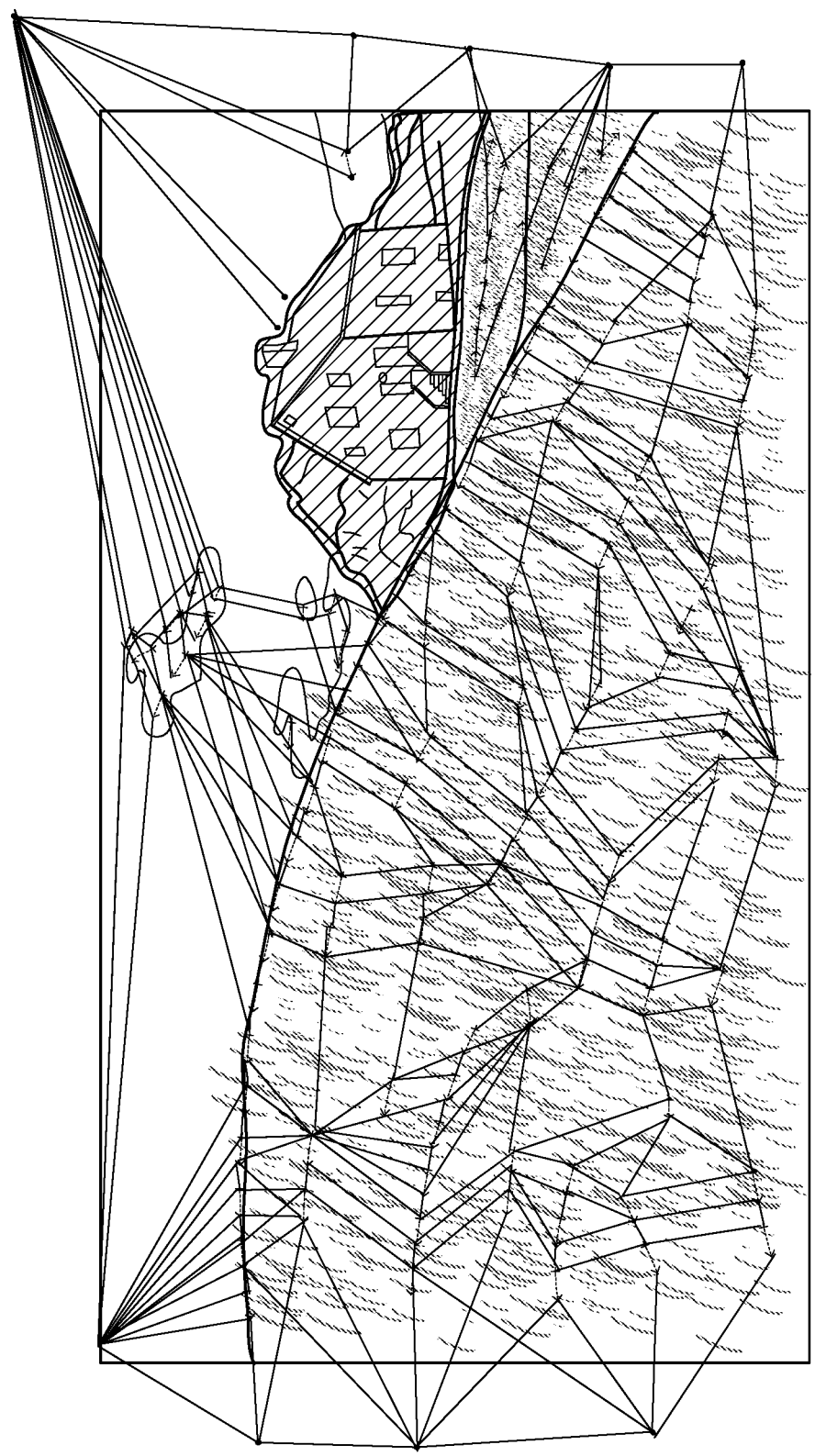

1

AUTOMATED PIXEL SHIFTING WITHIN A VIDEO FILE

CROSS-REFERENCE TO RELATED APPLICATIONS

This application claims priority to U.S. Provisional Application No. 62/574,055 entitled "AUTOMATED PIXEL SHIFTING WITHIN A VIDEO FILE," filed on Oct. 18, 2017; this application is also a continuation-in-part of U.S. application Ser. No. 15/660,677 entitled "Automated Pixel Shifting Within A Digital Image", filed on Jul. 26, 2017, which application claims priority to and the benefit of Provisional Application 62/514,703 entitled "Automated Pixel Shifting Within A Digital Image", filed on Jun. 2, 2017, and U.S. Provisional Application Ser. No. 62/368,017 entitled "Automated Pixel Shifting Within A Digital Image", filed on Jul. 28, 2016. The entire contents of each of the aforementioned applications and/or patents are incorporated by reference herein in their entirety.

BACKGROUND

Computers and computing systems have affected nearly every aspect of modern living. Computers are involved in work, recreation, healthcare, transportation, entertainment, household management, etc.

Computers, and in particular the fairly recent boom of digital photography and cinematography, have changed the entire photography and movie industries. For example, instead of having to carry large, bulky shoulder mounted cameras in order to film an event, many people are now able to capture high-quality HD video using only their mobile phone. The increased ease with which video and images can be captured has led to an explosion in the amount of shared multimedia content. Users will often post videos or photos to social media websites, email them to friends, or otherwise share them.

As more people share their multimedia content, there is an increased interest in editing and otherwise personalizing the multimedia content before it is shared. Adjusting relatively simple aspects of a digital image or video, such as color, provides many users with highly desirable tools for editing their digital images. Additional, tools are desirable for improving digital images and videos, such as the ability to incorporate movement within a digital image or additional movement effects into a video file.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In at least one embodiment disclosed herein comprise a computer system for automating the shifting of pixels within a digital video. The system receives a first starting point through a user interface. The first starting point is received through a user selection of a first beginning portion of a video frame. The system then receives a first ending point through the user interface. The first ending point is received through a user selection of a first ending portion of the user interface. The system selects a first set of pixels that lie between the first starting point and the first ending point. The system then shifts the first set of pixels in the first direction, wherein shifting the first set of pixels comprises rendering and re-rendering in a loop the first set of pixels being shifted.

Additionally, in at least one embodiment disclosed herein a computer system for shifting pixels within a video file accesses, from memory, a digital video file. The digital video file comprises information that corresponds to individual pixels within various frames of the digital video file. The system also receives a first starting point through a user interface, wherein the first starting point is received through a user selection of a first beginning portion of a first video frame. Additionally, the system receives a first ending point through the user interface, wherein the first ending point is received through a user selection of a second ending portion of a second video frame. The system then creates a first digital link between the first starting point and the first ending point. The first digital link comprises a first direction extending from the first starting point to the first ending point and a first length between the first starting point and the first ending point. The system further identifies a first set of pixels that lie between the first starting point and the first ending point. The system then shifts the first set of pixels in the first direction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings.

FIGS. 3A-3C illustrate embodiments of a photo that has received beginning and ending points.

FIG. 4 illustrates an embodiment of a photo that has formed a mesh from received beginning and ending points.

DETAILED DESCRIPTION

Embodiments disclosed herein comprise systems, methods, and computer-readable media that automate the shifting of pixels within a digital video file (also referred to as a "video file"). Disclosed embodiments provide interfaces and tools for automating the shifting of pixels within a video file. For example, disclosed embodiments automate the shifting of pixels within a video file of a landscape such that pixels are shifted in a way that was not captured at the time of recording.

In at least one embodiment, a user, through simple interface actions, selects portions of a frame in a video file to automate the shifting of pixels. The user controls the speed of the pixel shifting, the magnitude of the pixel shifting, the direction of pixel shifting, and various other attributes of the pixel movement. Additionally, the user applies masks to the movie frame to prevent pixels within specific portions of the frame from moving. As such, disclosed embodiments provide technical solutions for automating the manipulation of pixels within a video file.

Figure 1:
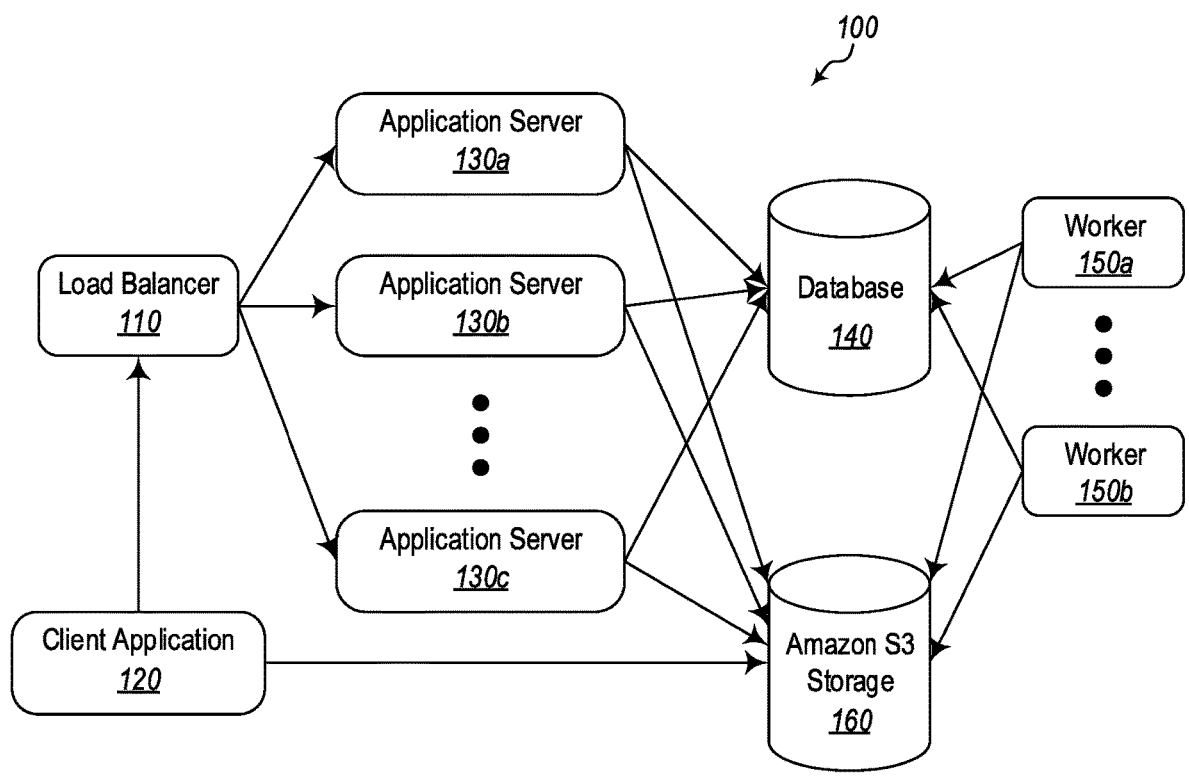
FIG. 1 illustrates a schematic of an embodiment of a computer system for automating the shifting of pixels within a digital image.

For example, FIG. 1 illustrates a schematic of an embodiment of a computer system 100 for automating the shifting of pixels within a video frame in a video file. The depicted computer system 100 comprises a variety of different components, including one or more client applications 120, load balancers 110, application servers 130(a-c), databases 140, and workers 150(a-b). In the depicted embodiment, the computer system 100 comprises a network-based or cloud-based system that allows a user to manipulate a video file over a network connection. One will understand, however, that alternate or additional embodiments may be otherwise configured such that the system is otherwise distributed or localized. For instance, in at least one embodiment, the system 100 is executed by a single local computer.

In at least one embodiment, a client application 120 is executed within a web browser at a user's computer. The client application 120 comprises a user interface for uploading, or otherwise selecting, a video file and issuing commands to cause one or more pixels within a video frame in the video file to shift. At least a portion of the processing and actual manipulation of the video file occurs on an application server 130(a-c) within the cloud. A load balancer 110 balances the processing load of one or more users between multiple application servers 130(a-c). For example, the load balancer 110 may ensure that each application server 130(a-c) is, on average, under the same processing load.

The application servers 130(a-c) and the client application 120 are in communication with one or more web storage services 160, such as AMAZON™ S3 storage. Additionally, the application servers 130(a-c) may be in communication with various backend databases 140. The various storage services 160 and databases 140 may store the video files and software components used within the computer system 100. The workers 150(a-b) manage the movement of the video files and software components within the storage services 160 and databases 140.

Figure 2:
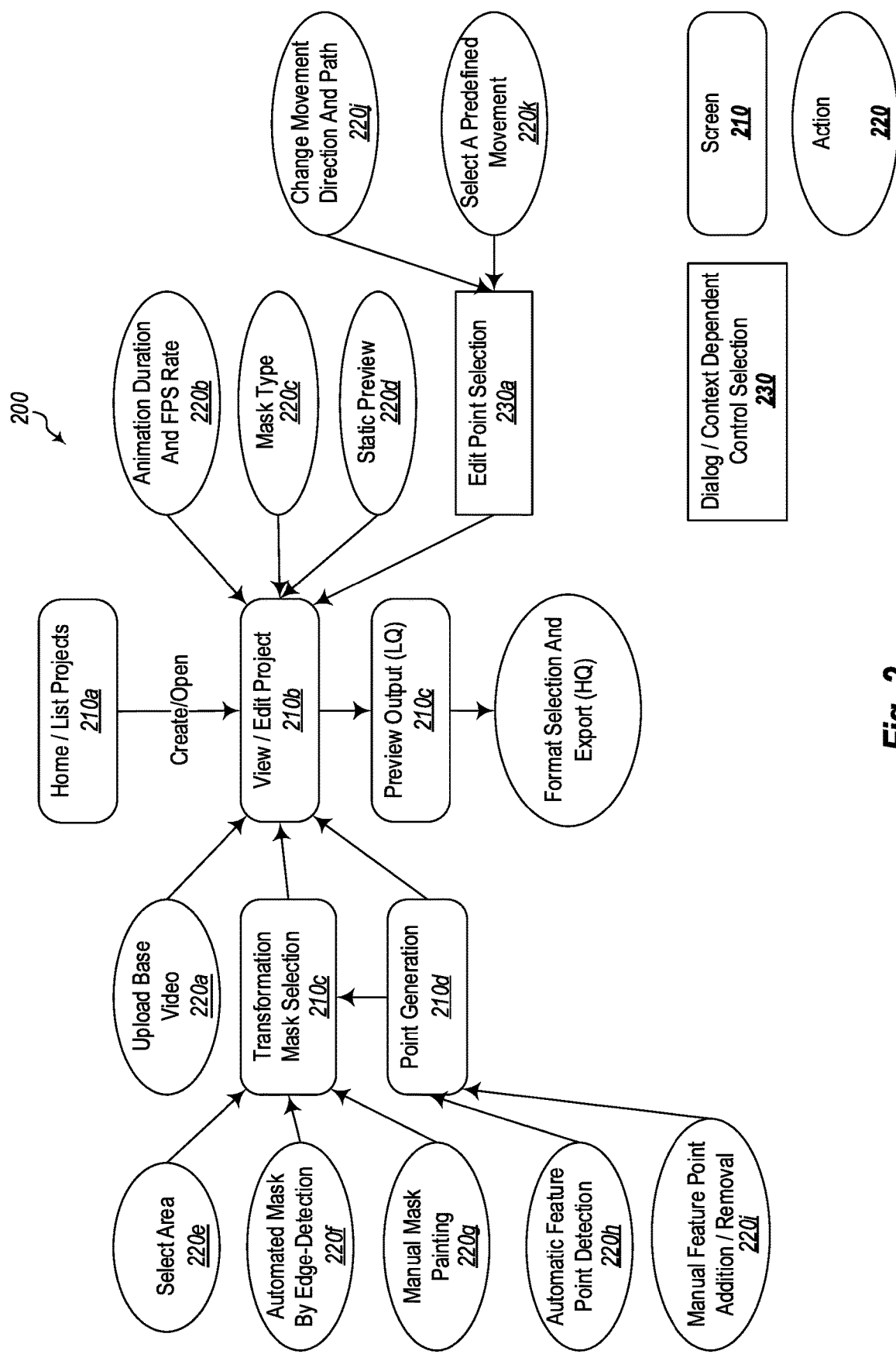
FIG. 2 illustrates a schematic of an embodiment of a software architecture for automating the shifting of pixels within a digital image.

FIG. 2 illustrates a schematic of an embodiment of a software architecture 200 for automating the shifting of pixels within a video frame in a video file. In particular, FIG. 2 depicts various screen interfaces 210, actions 220, and dialog/context dependent controls 230 that are present within the software architecture 200. In at least one embodiment, a user is presented with a Home/List Projects screen interface 210a. The Home/List Projects 210a provides the user with a selection of previously saved projects and/or the option to select a video file and initiate a new project.

Once a user selects a project of choice, the software architecture 200 accesses, from memory, a video file of interest. As used herein, a video file comprises a series of video frames that each comprise information that corresponds to individual pixels within each respective video frame. A view/edit project screen interface 210b provides the user with various editing options, both manual and automated. For example, the editing screen provides the user with actions for uploading a base video 220a, selecting a transformation mask 210c, generating points 210d, adjusting animation duration and FPS rate 220b, selecting a mask type 220c, generating a static preview 220d, and editing a point selection 230a.

As used herein, a mask defines a static portion of the video frame with respect to shifting. In at least one embodiment, a user is presented with options to select between various different types of transformation mask operations. For example, the user can choose a select area option 220e that allows a user to draw boundaries around an area. A mask is then automatically generated within that area. Additionally, a user may select an automated mask by edge-detection option 220f that scans a video frame and automatically identifies distinct areas within the image based upon edge detection. A user may also select a manual mask painting option 220g that allows a user to manually draw a mask on the video frame.

In at least one embodiment, the mask is created by using a combination of two tools—automatic and manual. The automatic tool lets the user define masked or shifted areas by drawing lines in them. Any added lines trigger an automatic edge detection using a watershed transformation on the video frame gradient. This generates a binary mask image that the user can later modify via a simple brush tool. The final mask image is then once again passed through edge detection, so it can be saved in vector format.

Figure 3A:
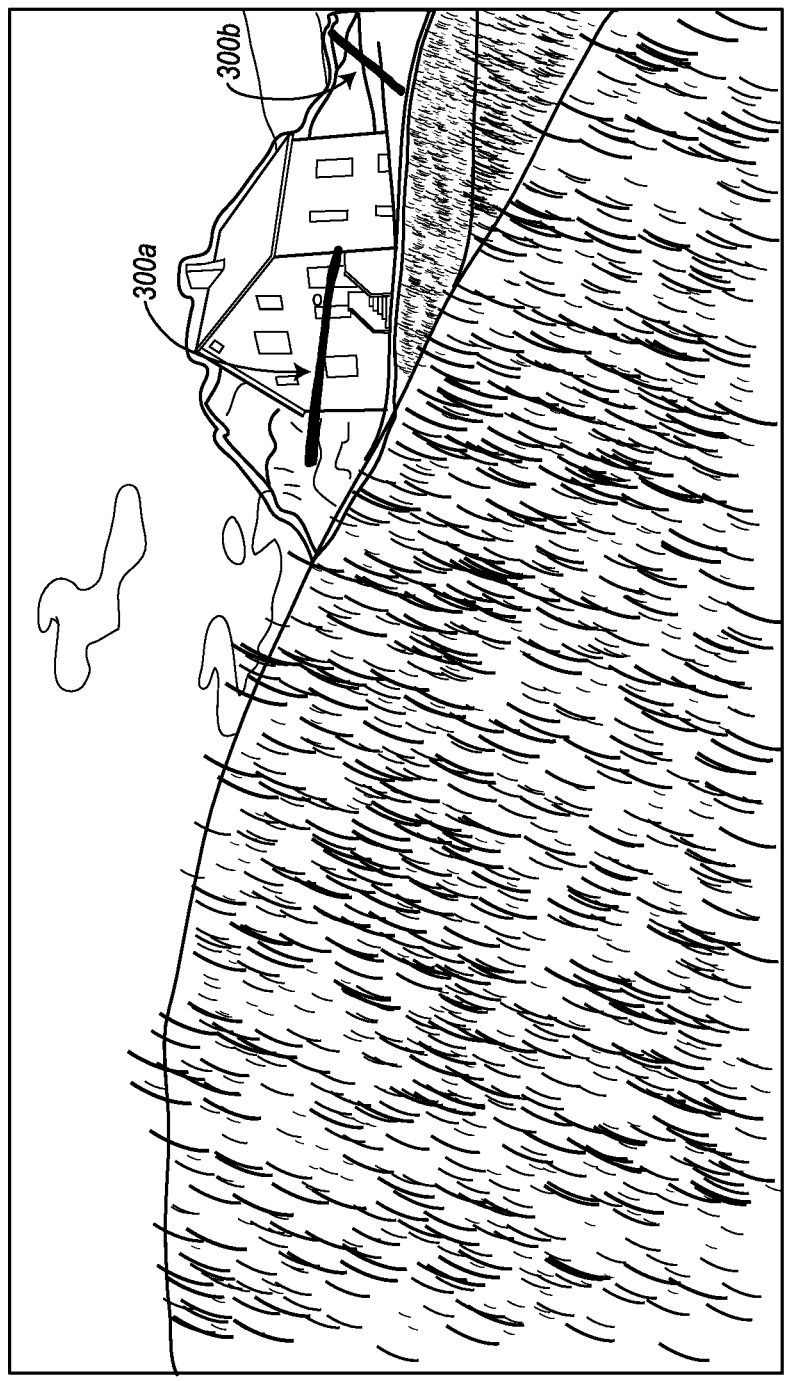

For example, FIG. 3A depicts a user utilizing the automated mask by edge-detection option 220f. In particular, the user has drawn two lines 300a, 300b across the house and mountain behind the house. The software architecture 200 interprets the lines as indicating the area that the user wishes to mask. In at least one embodiment, a user may only select a single pixel within the area that should be masked. Various different embodiments may accept a variety of different input interfaces. For example, a user may draw the lines using a computer mouse, a touch interface, a stylus interface, a keyboard interface, or any number of other user interfaces.

Figure 3B:
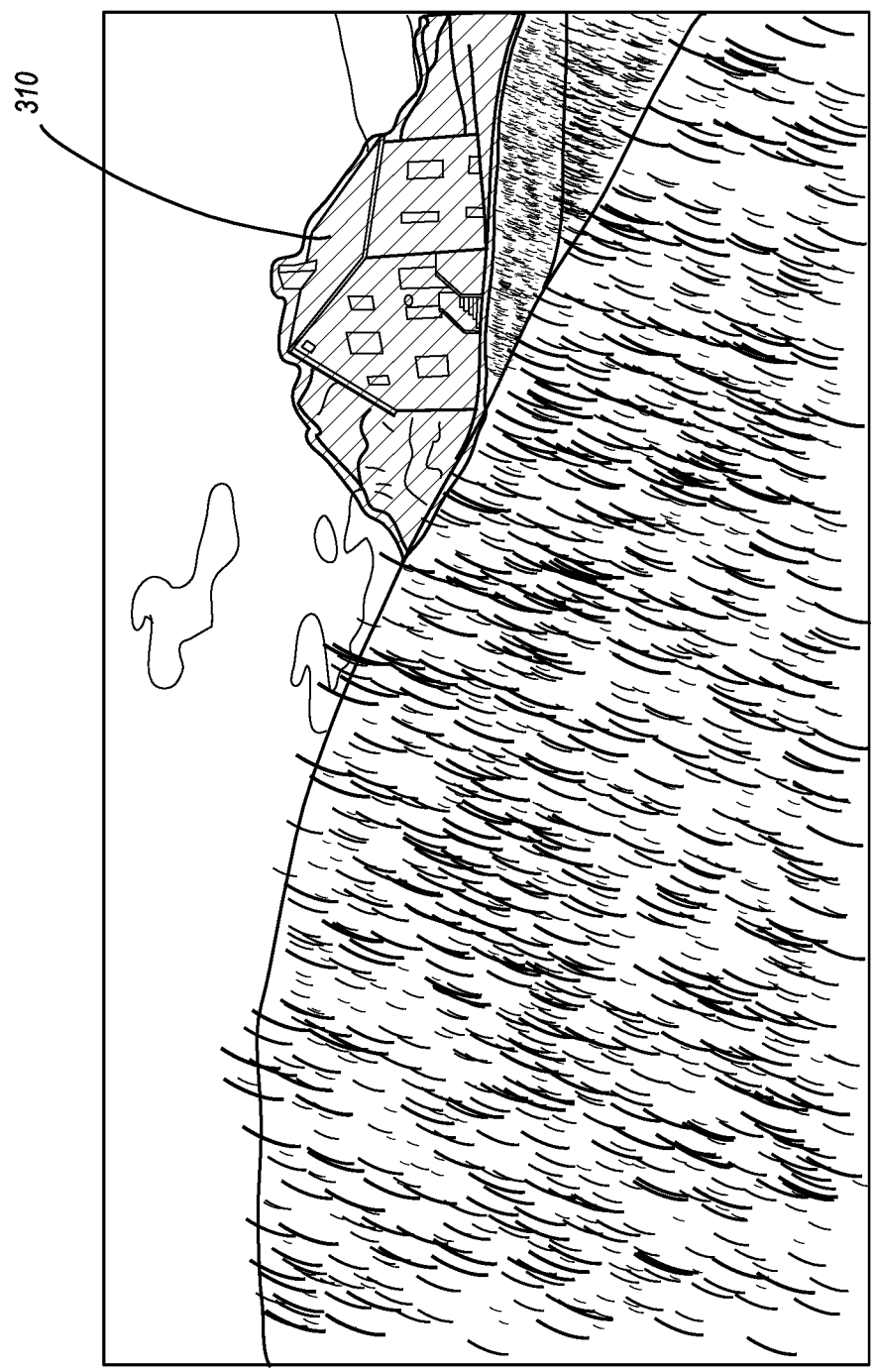

Upon receiving the selection, the software architecture 200 performs an edge detection method to identify edges that form boundaries around the selected area. After identifying a boundary, the software architecture 200 generates a mask to cover the area within the boundary. For instance, FIG. 3B illustrates a mask 310 covering the house and the mountain behind the house, but excluding the sky and the grass in front of the house.

In at least one additional or alternative embodiment, the software architecture 200 maps the mask to subsequent video frames by performing a similar edge detection method on one or more chronologically related video frames. Using edge detection methods, the software architecture is able to identify the boundaries of the house and mountain in related video frames. In at least one embodiment, the software architecture automatically scans preceding and subsequent frames to determine whether a proper edge detection of the house and mountain can be performed. In at least one embodiment, the software architecture 200 applies image recognition algorithms to the subsequent frames and applies the mask based upon the identified common objects in the subsequent frames.

Additionally or alternatively, the software architecture 200 can receives inputs from a user defining the frames that should be analyzed using the edge detection method. As such, a user is provided with tools for identifying a particular portion of the video frame to mask. The mask can then be extended to subsequent or preceding video frames. The mask prevents pixels covered by the mask from being shifted.

In at least one embodiment, a mask is applied in one of two ways. In the first application method, the mask is fixed and is applied by adding static (unmovable) points on all mask edges. In the second application method, the mask is an overlay that cuts-and-pastes the masked portions of the image on top of the animation.

In at least one embodiment, methods other than generating a mask are used to prevent portions of a video frame from moving. For example, in at least one embodiment, a user selects the manual mask painting option 220g and manually places stabilizer points around a portion of the video frame that should not move. The stabilizer points indicate to the architecture software that pixels associated with the stationary points should be not be shifted or otherwise moved. In at least one embodiment, the stabilizer points are useable for creating a fence around an area that should not be shifted. For example, placing the stabilizer points causes the architecture software to stop shifting pixels at a boundary that is made up of the stabilizer points. In at least one embodiment, the software architecture 200 matches the stabilizer point placement to subsequent or previous frames based upon line detection, images recognition, or other related methods.

The software architecture 200 also provides a user with a point generation display 210d (shown in FIG. 2) that comprises options 220h, 220i for generating points. For example, the user may be provided with an automatic feature point detection option 220h that generates points through automatic feature point detection or a manual feature point addition/removal option 220i. When generating points through automatic feature point detection the software architecture 200 identifies areas outside the mask that are associated with directional texture, directional patterns, that otherwise comprise a visually detectable pattern of motion. For example, FIG. 3C depicts the picture of the house and landscape with points drawn throughout the foreground grass 320a and points drawn throughout the clouds in the sky 320b.

In at least one embodiment, the software architecture 200 places the points within the grass based upon identified lines and edges within the grass that extend outward from the ground or from the user generated mask 310. Based upon the lines and textures associated with the grass extending upwards and away from the ground, the software architecture 200 determines that the grass is associated with movement away from the ground. As such, the software architecture 200 automatically places points through the grass.

The software architecture 200 is similarly able to place points within previous and/or subsequent video frames. Further, in at least one additional or alternative embodiment, the software architecture 200 analyzes a batch of video frames together to determine the placement of points. For example, by analyzing a series of video frames the software architecture 200 can identify specific lines and edges that move in concert between frames. Such identified movement may inform the placement of points within each video frame.

In at least one embodiment, a user can alternatively or additionally manually add or remove points. For example, a user can manually add all of the points depicted in FIG. 3C or a user can direct the software architecture 200 to automatically add a portion of the points and then the user can add additional points. In at least one embodiment, the user can specific that removed and added points are video frame specific and are not propagated to other video frames. In contrast, in at least one embodiment, manually added and removed points are automatically propagated through video frames.

Additionally, in at least one embodiment, the software architecture 200 is able to automatically place points into live video using the methods described herein. For example, a user may take live video of a stream. The software architecture may, in real-time, analyze the live video, identify directional information within the video, place points within the river, and start shifting the pixels as the live video is displayed to the user. The user may further be able to edit and move the points while the live video is playing. Accordingly, the software architecture 200 can function in real-time on live video data.

In at least one embodiment, points are added to a video frame in two different stages. During the first stage, the software architecture 200 receives a first starting point through a user interface. A starting point is received through a user selection of a beginning portion of the video frame. The beginning portion of the video frame comprises a starting pixel, or area, from which the user wishes pixels to shift. For example, in FIG. 3C, various beginning points (also referred to herein as "starting points") comprise the points nearest to the base of the grass and represented by crosses. In at least one embodiment, a beginning point comprise a particular pixel that is selected by a user or automatically selected by the software architecture 200.

During the second stage of the point generation, the software architecture 200 receives an ending point through the user interface. The ending point is received through a user selection of an ending portion of the video frame. The ending portion of the video frame comprises an ending pixel, or area, to which the user wishes pixels to shift. In at least one embodiment, the ending portion may be within the same video frame as the starting point or within a subsequent video frame.

In FIG. 3C various ending points are selected on the outer periphery of the grass and are represented by arrows. In at least one embodiment, each starting point is paired with a specific ending point and vice versa. Additionally, the software architecture creates a link (also referred to herein as a "digital link") between the starting point and first ending point. In at least one embodiment, a link is a vector extending from the starting point to the ending point. A link comprises a direction extending from the first starting point to the first ending point and a length between the first starting point and the first ending point.

A user is capable of choosing the direction of a link and length of a link at will. For example, upon placing a starting point, the user can place an associated ending point at any other location within the user interface—even outside the edges of the video frame or outside the edges of a subsequent video frame. As such, in at least one embodiment, a single video frame can be associated with a multitude of different starting points, ending points, and associated links going in different directions and comprising different lengths. In the case the points are generated automatically by the software architecture 200, a user is free to move and adjust the points in any way that is desirable.

In at least one embodiment, the software architecture 200 generates a starting mesh from the collective starting points. Similarly, the software architecture 200 generates an ending mesh from the collective ending points. For example, FIG. 4 depicts a starting mesh and ending mesh overlaid on the video frame of the house and landscape. In at least one embodiment, the software architecture provides the user with the option of viewing one or both of the meshes. Visualizing the meshes may assist a user in viewing the inputs that cause the pixels to shift.

Once a user has established one or more starting and ending point pairs, the software architecture identifies sets of pixels that lie between the respective starting points and the respective ending points. In at least one embodiment, a first set of pixels may comprise a group of pixels that intersect with a link between a starting point and an ending point and that are not covered by a mask. The size of the group of pixels may be user selectable or automatically determined. For example, a user may increase the threshold distances that the set of pixels extend beyond the link. As such at one extreme, the set of pixels may comprise a line of individual pixels extending from the starting point to the ending point, or at another extreme the set of pixels may comprise a relatively wide swatch of pixels that are parallel to the link that extends between the starting point and the ending point.

After identifying the appropriate set of pixels associated with each starting point and ending point pair, the software architecture 200 shifts the respective sets of pixels in the direction determined by their relative links. In at least one embodiment, shifting the sets of pixels comprises rendering and re-rendering in a loop the sets of pixels being shifted. Additionally, as described above, different sets of pixels may be associated with different directions. As such, sets of pixels may travel in different directions within the video frame.

In at least one embodiment once pixels begin to shift, the user may notice that a particular portion of the video frame that the user desired to not move is in fact being shifted. To correct this error, the user can edit the mask such that it covers the portion of interest. Additionally, in at least one embodiment, to correct the error, the user executes a feather tool that blurs the portion of interest such that the shifting pixels are no longer noticeable. In a further embodiment, the user places stabilizer points along the portion of interest. The stabilizer points may be placed with a simple click along the particular portion of the video frame. The stabilizer points cause pixels within the particular portion of the video frame to not be shifted.

Figure 5A:
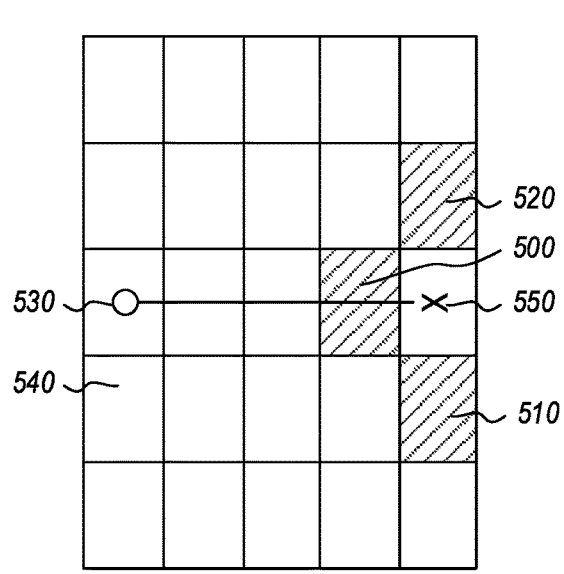
FIGS. 5A-5D illustrates embodiments of individual pixels being shifted.

By way of example, FIGS. 5A-5D depict embodiments of individual pixels being shifted. In particular, FIG. 5A depicts a starting point 550, an ending point 530, and an associated link 540. Additionally, FIG. 5A depicts exemplary pixels 500, 510, and 520. One will understand that the pixels 500, 510, 520 are provided only for the sake of clarity and explanation and that in various embodiments the pixels may comprise a variety of different colors.

Figure 5B:
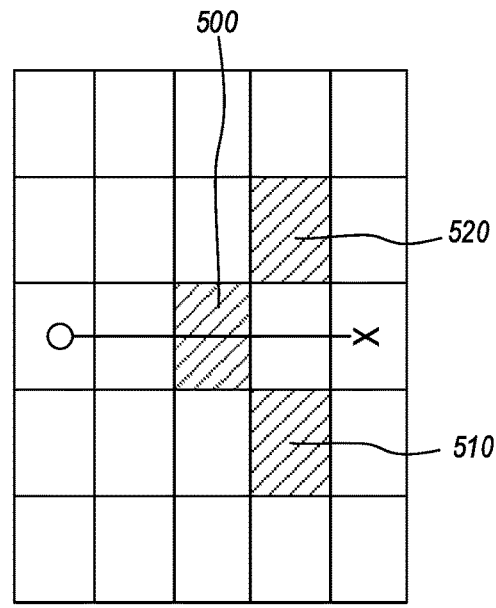

FIG. 5A depicts the pixels 500, 510, 520 in their original state within the video frame. Once the software architecture 200 begins shifting the set of pixels in the direction of the link (extending from the starting point to the ending point), the pixels 500, 510, 520 are moved. For example, FIG. 5B depicts the pixels 500, 510, 520 after the initial movement. As compared to FIG. 5A the set of pixels are shifted left, along the direction of the link, one space.

In various embodiments, a user is provided with an animation duration and FPS rate option 220*b* (shown in FIG. 2) for determining the step size within the shift and/or the shifting rate at which the shift occurs. For example, while the embodiment depicted in FIGS. 5A-5D have a step size of a single pixel space, in various embodiments, the pixels may shift multiple pixels at a time. Additionally, in at least one embodiment the step size is time constrained. For example, a user may indicate that each respective loop in the pixel shifting only take 2 seconds. In such a case, the step size may be determined by the length of the link and the frame rate of the shifting. In other words, one set of pixels may need to travel a link length of 20 pixels within the 2 seconds, while another set of pixels may only need to travel a link length of 6 pixels within two seconds. As such, based upon the frame rate at which the steps occur, the two sets of pixels would operate at different step sizes.

In at least one embodiment, a user can set a particular desired shifting rate to be associated with the movement of pixels within a video frame. The shifting rate may comprise a speed that is faster than the frame rate associated with the video frame in which the pixels are moving. In at least one embodiment, the higher shifting rate is achieved by increasing the step size of the shifted pixels such that the shifted pixels appear to be moving faster than the non-shifting pixels within the video frame. In at least one embodiment, the magnitude of the shifting of a set of pixels is proportionally related to the length of an associated link.

In at least one embodiment, the selected shifting rate is applied to a series of video frames such that the pixels are shifted at the speed indicated by the user, while the video frames continue to play at their originally intended frame rate. As such, a user may select a shifting rate that is either slower or faster than the original framerate of the video file. In contrast, in at least one embodiment, the framerate of the pixels shifting matches the framerate of the video file.

In at least one embodiment the step size of each set of pixels is consistent such that sets of pixels along longer links take more time to complete a loop than sets of pixels along shorter links. Accordingly, a user can create a particularly long link to indicate a long, or more extended, motion within a video frame. In contrast, the user can create a particular short link to indicate a short, or faster, motion within the video frame.

Figure 5C:
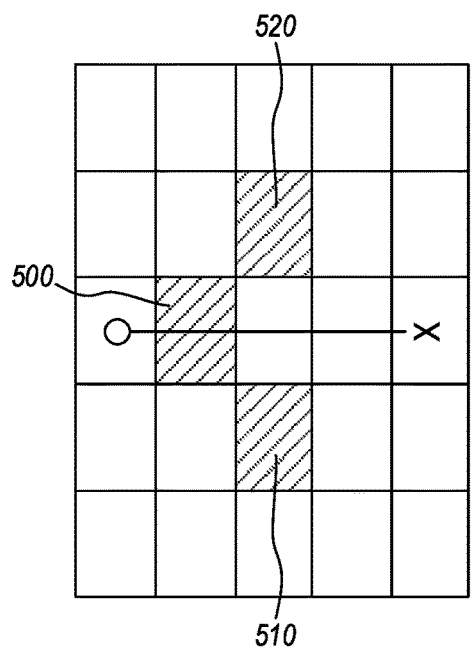
Figure 5D:
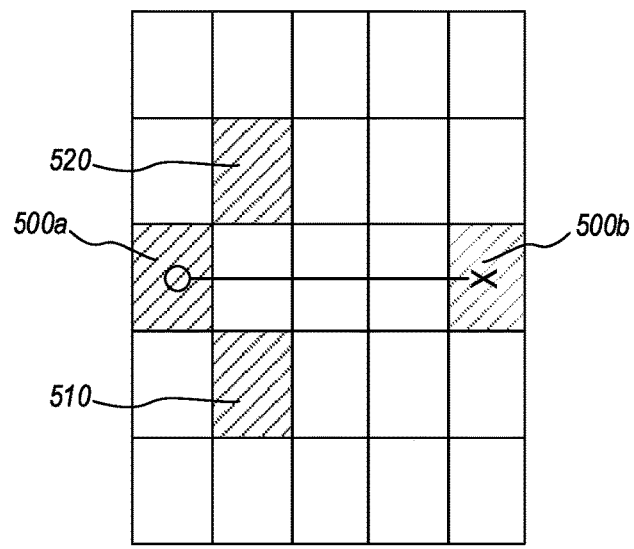

FIG. 5C depicts pixels 500, 510, 520 another step along the shift. In FIG. 5D the pixels 500, 510, 520 are shown at yet another step along the shift, but in this step the pixels 500, 510, 520 are beginning to loop around. For example, pixel 500*a* is at the left of the shift, while corresponding pixel 500*b* is reappearing at the right of the shift to begin the shifting loop.

In various additional or alternative embodiments, the set of pixels only begins to loop as pixels 500, 510, 520 reach the end of the link. For example, once pixel 500*a* reaches the end of the link (i.e., ending point 530), pixel 500*a* disappears on the next step. Upon disappearing, pixel 500*b* then reappears at the beginning of the link (i.e., starting point 550) to start the loop. Additionally, in at least one additional or alternative embodiment, the pixels 500, 510, 520 fade in and out at the beginning and ending of each loop. For example, upon reaching the end of the link, pixel 500*a* fades out of the video frame by slowing growing transparent, such that the disappearance of pixel 500*a* is not abrupt or jarring. Similarly, pixel 500*b* can fade in such that its appearance is not abrupt of jarring.

In at least one embodiment, the pixels do not loop within the video frames but instead only complete a single entire shift along the digital link. In contrast, in at least one embodiment, a user can indicate a shifting rate or a number of loops that causes the pixels to loop through a shifting sequence multiple times between a starting point in a first video frame and an ending point in a second video frame.

In various alternative or additional embodiments, different methods of pixel shifting and blending can be used to similar effect. For example, in at least one embodiment, the pixels immediately begin cycling as soon as the shifting begins. For example, instead of what is shown in FIGS. 5A-5D, as soon as pixel 500 shifted to its new position depicted in FIG. 5B, pixel 500B would appear in the position depicted in FIG. 5D. As such, the pixels begin looping and blending into each other immediately.

In at least one embodiment, the software architecture 200 uses alpha blending when shifting the pixels from the starting point to the ending point. For example, the software application 200 may utilize a sin, cosine, or linear alpha blend to shift the set of pixels. Additionally, in at least one embodiment, the software architecture uses a warping function, such as a Shepard's distortion. When using a mesh algorithm, the software architecture 200 triangulates the mesh using defined points and then calculates an affine transformation for every triangle. Further, the software architecture 200 supports animation blending in order to achieve the seaming effect of a continuous motion. This is achieved by blending animated frames two by two using one of a few predefined blend functions.

Similarly, a user is provided with a mask type option 220*c* (shown in FIG. 2) to select between different types of masks. Each different mask type may use different mask configurations. In at least one embodiment, mask types also vary by the color that is used to depict the mask within the image.

Figure 6B:
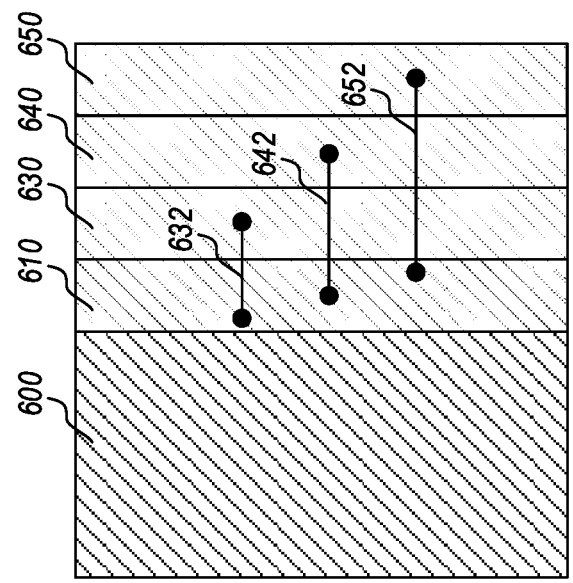
FIG. 6B illustrates another embodiment of a mask.
Figure 6A:
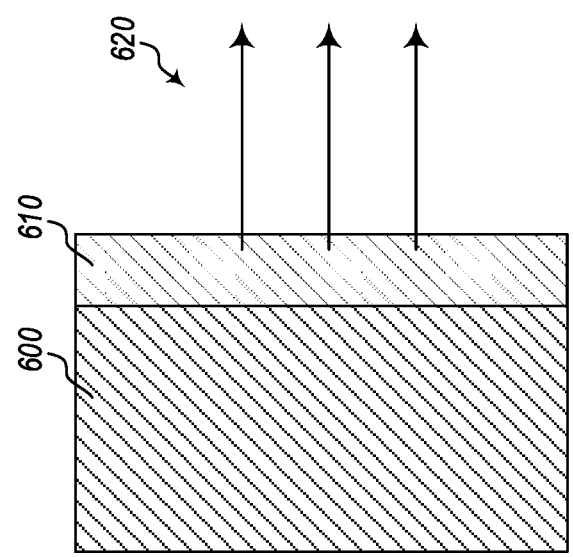
FIG. 6A illustrates an embodiment of a mask.

For example, FIGS. 6A and 6B illustrate an embodiment of a mask 600. In the depicted embodiment, a strip of points 610 on the edge of the mask ("edge strip") is used to generate the flow of points simulating an animation. The dimensions and shape of the edge strip depend on properties of the mask and the user selected flow. In at least one embodiment, the width of the edge strip 610 is determined as a linear function of the dimensions of the target image. Further, the shape of the edge strip 610 may be a result of sliding the shape of the mask 600 in the direction of the vector flow. As such, a user is able to customize the mask.

When in use, the mask 600 assists in generating pixel flow. For example, as depicted in FIG. 6B the points 632, 642, 652 on the edge strip 610 are being stretched in order to generate a flow of points in the desired direction. For example, the points 632, 642, 652 are shown as being stretched to strips 630, 640, 650 that are stretched from the edge 610 of the mask 600. The stretching motion is performed continuously such that the points 632, 642, 652 are continuously reset and stretched such that the pixel shifting is continuous and results in the impression of motion.

In various additional or alternative embodiments, a user has the ability to further manipulate a video frame. For example, instead of the straight links depicted in FIGS. 5A-5D, the user can view an edit point selection dialog 230*a* as depicted in FIG. 2. The edit point selection dialog 230*a* provides a user with the options of changing a movement direction and path 220*j* or selecting a predefined movement 220*k*. For example, instead of straight links extending between a starting point and ending point, the user can create a custom path between any two starting and ending points. In such a case, the associated set of pixels would travel along the path of the link. Similarly, the user may select a predefined path (i.e., movement) that is defined within the software architecture 200. For example, the predefined paths may include a curved path. Using the curved path option, the user can cause a set of pixels to travel along a curved path (i.e., link) between a starting and ending point.

Once a user is satisfied with their work on a video frame, a preview output screen 210*e* allows a user to view the video frame while the pixels are being shifted. Such a view may give the impression that at least a portion of the static video frame is animated. In contrast, a user is also given a static preview option 220*d* that allows the user to view the shifting pixels within the video file as the video file is played. If the user is satisfied with the final product, the user is provided with a format selection and export action 220. This action generates a variety of different formats that are configured for viewing. For example, an animated GIF may be produced.

Additionally, in at least one embodiment, a user is able to save all of the masking work, point generation work, and animation duration and FPS rate work separate from the underlying video frame. For example, the user may perform the above discussed steps on a particular video frame. The user may then decide to manipulate the video frame within a video editor application. In such a case, instead of having to restart the animation process with the modified video frame, the user applies the previously saved animation work to the modified video frame.

Figure 7:
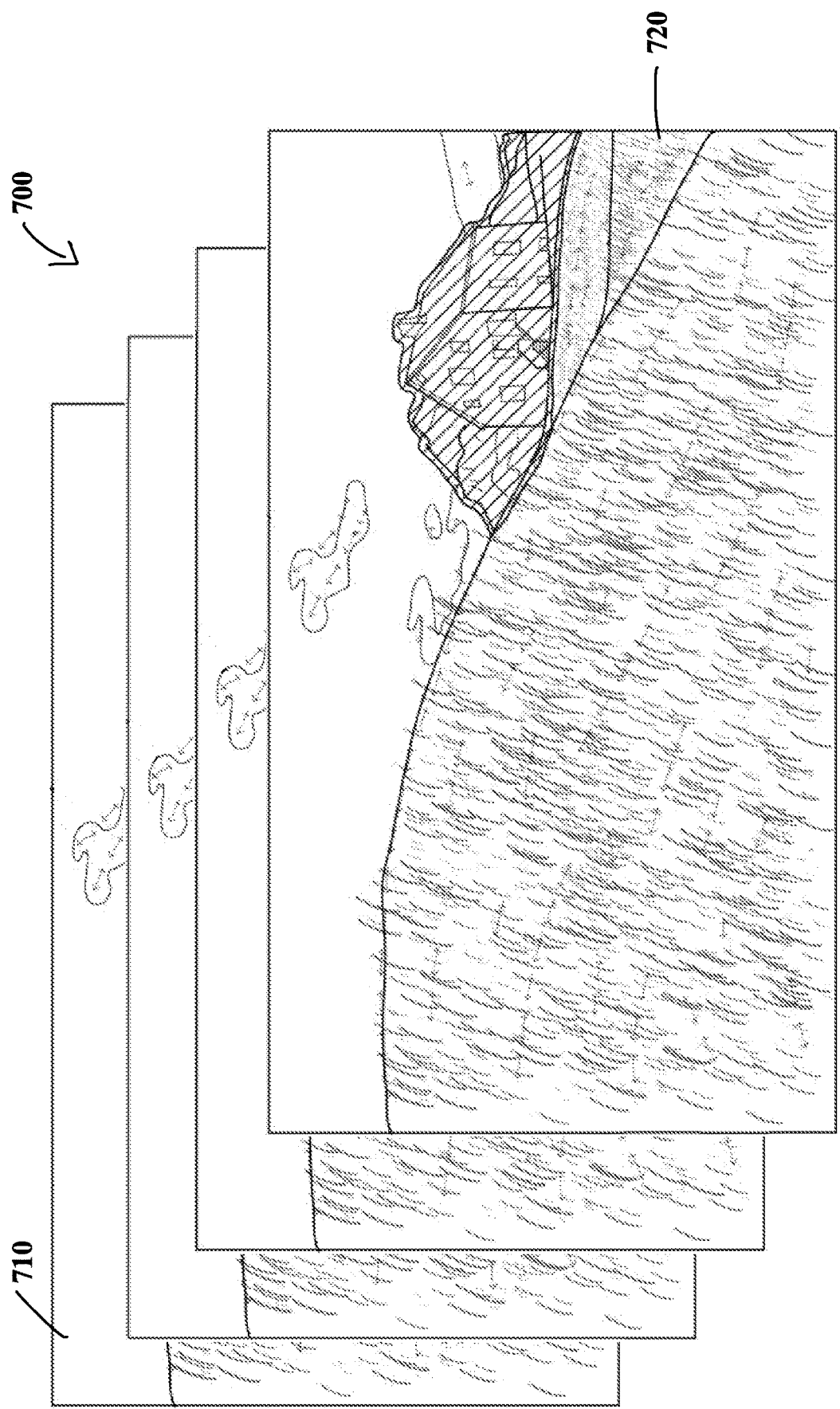
FIG. 7 depicts a collection of video frames that comprise shifted pixels.

FIG. 7 depicts a collection of video frames 700 that have been through the process described herein. For example, each video frame in the collection of video frames 700 comprises points for animating each frame. In at least one embodiment, the user's pixel shifting is displayed over a series of video frames. In contrast, in at least one embodiment, a user's pixel shifting is displayed through the addition of new pixel shifted frames between the original video frames within the video file.

As the video file progresses from video frame 710 to video frame 720, pixels are shifted as indicated by the user. As such, the normal movement of pixels that are associated with the video playing and augmented by the pixel shifting that the user added to the video file. For example, the user may cause the cloud in the sky to shift in a different direction or different way than the original video displayed.

In at least one embodiment, a user can select a first starting point in a first video frame 710 and a first ending point in a second video frame 720. The software architecture 200 then creates a first digital link that extends from the first starting point in the first video frame 710 to the first ending point in the second video frame 720. In at least one embodiment, a visual indication of the digital link is displayed to a user in such a way as to indicate that multiple video frames are involved. The digital link indicates a direction of pixel flow from the first starting point in the first video frame 710 to the first ending point in the second video frame 720.

In at least one embodiment, when shifting pixels between multiple video frames 700, the computer architecture 200 selects, from within the first video frame 710, a first set of pixels adjacent to the first digital link and shifts the first set of pixels within the first video frame 710 along a first portion of the first digital link. The computer architecture 200 then selects, from within the second video frame 720, another set of pixels adjacent to the first digital link and shifts the other set of pixels within the second video frame 720 along a second portion of the first digital link. One will appreciate that such a process can be further subdivided among as many different video frames 700 as necessary.

In at least one embodiment, the number of shifted pixels is evenly divided between the different video frames 700. Further, in at least one embodiment, the pixels within each video frame are shifted up an equal proportion of the digital link. For example, if the pixels are shifted between two different video frames 710, 720, the software architecture 200 will cause the pixels to shift along the first half of the digital link within the first video frame 710. The software architecture 200 will then cause the pixels to shift along the second half of the digital link within the second video frame 720.

In at least one embodiment, a user can control how pixels shift by masking and shifting pixels in a first video frame 710 and a final video frame 720. The software architecture 200 then automatically causes the pixels to shift in the intermediate frames so that gradually transition from the first video frame 710 and a final video frame 720.

Additionally, in at least one embodiment, the software architecture is configured to automatically incorporated pixel shifting into a video file. For example, as soon as a user opens a video file, the software architecture performs image recognition on the video, identifies target objects in the video file, and applies pixel shifting to those target objects. For instance, the user may open a video file showing a horse walking through a field. The software architecture, using image recognition, may identify the horse's mane and automatically apply pixel shifting to the horse's mane. As such, the user is able to appreciate the pixel shifting effect without any effort. One will appreciate, however, that in at least one embodiment, the user is able to further change the pixel shifting effect to be different than the automatic effect.

In at least one embodiment, similar functionality can be built into a filter that is applicable to a video or image. For example, a particular filter may be built that automatically causes background pixels to shift. A user can then select pre-built pixel shifting effect, before the user has taken the picture or video. In at least one embodiment, multiple different filter types for both videos and images are available. For example, a particular video file may be provided for shifting pixels in the background of a video file. A user can select the particular filter and then record a video scene. The filter is applied to the video in real time as the video is captured. In at least one embodiment, the filter is selected before recording begins, such that pixel shifting occurs immediately as soon as recording begins. As such, the user can view the pixels shifting in the background of the video as the user records a scene. Other examples of filters may include filters for shifting pixels in individual's hair, filters for shifting pixels in water, filters for shifting pixels in nights skies, and similar types of filters.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
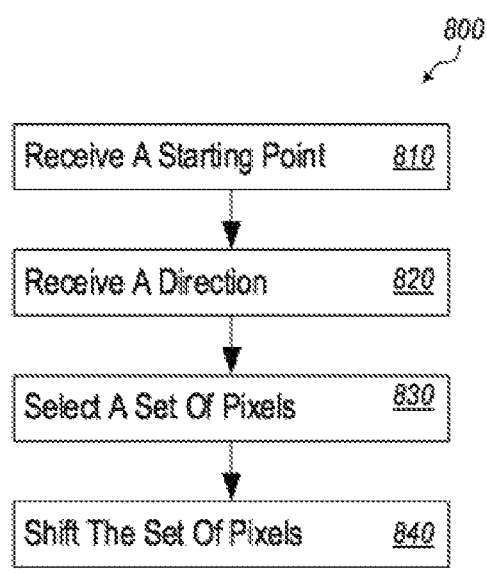
FIG. 8 illustrates a flow chart of an embodiment of a method for automating the shifting of pixels within a video frame.

These methods can further be described as a series of steps or acts in a method. For example, FIG. 8 illustrates that a flow chart of an exemplary method 800 for automating the shifting of pixels within a video file includes an act 810 of receiving a starting point. Act 810 comprises receiving an indication of a starting point through a user interface, wherein the starting point is received through a user selection of a particular portion of the video frame. For example, as depicted and explained with respect to FIG. 5A, a user selects a starting point 550. Similarly, FIG. 3C depicts various user-selected starting points surrounding the grass in the video frame.

Additionally, FIG. 8 illustrates that the method includes an act 820 of receiving a direction. Act 820 comprises receiving, through the user interface, a direction associated with the starting point. For example, as depicted and explained with respect to FIG. 5A, the user can select an ending point 530. A link 540 is then formed between the starting point 550 and the ending point 530. The link 540 is associated with a direction extending from the starting point 550 to the ending point 530. As such, the software architecture 200 receives a direction from the link 540.

In contrast, in additional or alternative embodiments, the software architecture 200 can receive a direction without the use of an ending point 530 or a link 540. For example, the software architecture 200 may receive the direction from a default setting stored within memory or explicitly from the user. Further, in at least one embodiment, the software architecture 200 identifies a direction from line and edge detection. For example, the software architecture 200 may identify a direction that follows the blades of grass depicted in FIG. 3A. In any case, in at least one embodiment, a user may only need to enter a starting point and the direction is identified either automatically or through user interaction other than the creation of an ending point.

FIG. 8 also illustrates that the method includes an act 830 of selecting a set of pixels. Act 830 comprises selecting a set of pixels extending in the direction away from the starting point. For example, as depicted and explained with respect to FIG. 5A, the software architecture 200 selects a set of pixels 500, 510, 520 that extend in the direction of the link 540 away from the starting point 550. The computer architecture 200 may define the set of pixels 500, 510, 520 as being every pixel that extends in the direction away from the starting point and that is within a user or computer-defined threshold distance from the link 540.

Further, FIG. 8 illustrates that the method includes an act 840 of shifting the set of pixels. Act 840 comprises shifting the set of pixels in the first direction. Shifting the set of pixels comprises rendering and re-rendering in a loop the set of pixels being shifted. For example, as depicted and explained with respect to FIGS. 5A-5D, a shifting loop is described where pixels 500, 510, 520 are shifted upward and then re-looped.

Figure 9:
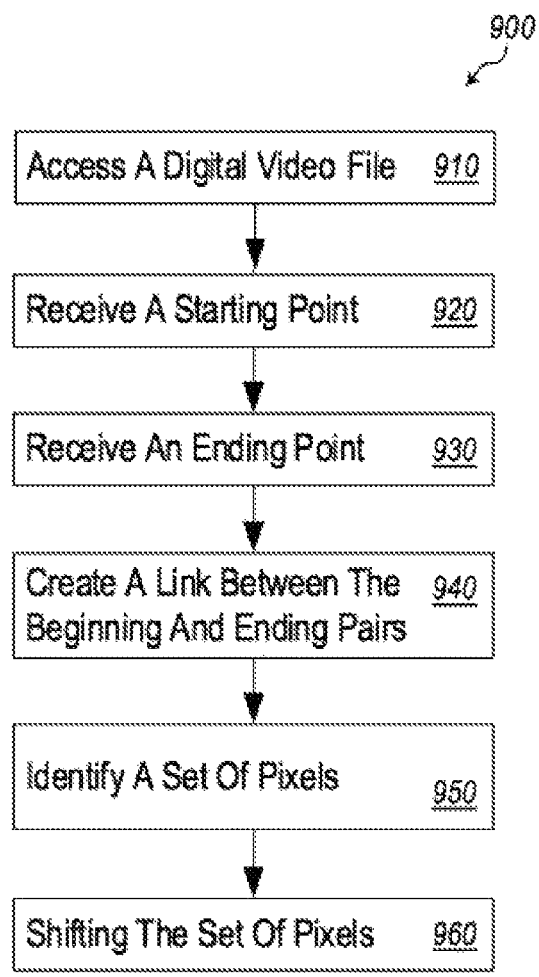
FIG. 9 illustrates another flow chart of an embodiment of a method for automating the shifting of pixels within a video frame.

Additionally, FIG. 9 depicts an embodiment of a method 900 for shifting pixels within a video file comprising a step 910 of accessing a digital video file. Act 910 includes accessing, from memory, a digital video file, wherein the digital video file comprises information that corresponds to individual pixels within various frames of the digital video file. For example, as depicted and described with respect to FIG. 1, a user can upload a digital video file through a client application 120. The computer system 100 then receives the digital video file.

FIG. 9 also illustrates that the method 900 includes an act 920 of receiving a starting point. Act 920 comprises receiving a first starting point through a user interface, wherein the first starting point is received through a user selection of a first beginning portion of a first video frame. For example, as depicted and explained with respect to FIG. 5A, a user selects a starting point 550. Similarly, FIG. 3C depicts various user-selected starting points surrounding the grass in the digital image.

FIG. 9 also illustrates that the method 900 includes an act 930 of receiving an ending point. Act 930 comprises receiving a first ending point through the user interface, wherein the first ending point is received through a user selection of a second ending portion of a second video frame. For example, as depicted and explained with respect to FIG. 5A, a user selects an ending point 530. Similarly, FIG. 3C depicts various user-selected starting ending surrounding the grass in the digital image.

In addition, FIG. 9 illustrates that the method 900 includes an act 940 of creating a link between the pair of end points (meaning the beginning and the ending pair). Act 940 comprises creating a first digital link between the first starting point and the first ending point. The first digital can comprise a first direction extending from the first starting point to the first ending point and a first length between the first starting point and the first ending point. For example, as depicted and explained with respect to FIG. 5A, a link 540 is created between beginning points 550 and ending points 530. Similarly, FIG. 7 depicts various links connecting beginning points and ending points when the beginning and ending points are in different video frames 710, 720.

Further, FIG. 9 illustrates that the method 900 includes an act 950 of identifying a set of pixels. Act 950 comprises identifying a first set of pixels that lie between the first starting point and the first ending point. For example, as depicted and explained with respect to FIG. 5A, the software architecture 200 identifies a set of pixels 500, 510, 520 that extend in the direction of the link 540 away from the starting point 550. The computer architecture 200 may define the set of pixels 500, 510, 520 as being every pixel that extends in the direction away from the starting point and that is within a user or computer-defined threshold distance from the link 540. Additionally, as depicted with respect to FIG. 7, the set of pixels may comprise multiple different pixels spread across several video frames 710, 720.

Further still, FIG. 9 illustrates that the method 900 includes an act 960 of shifting the set of pixels. Act 960 comprises shifting the first set of pixels in the first direction. For example, as depicted and explained with respect to FIGS. 5A-5D, a shifting loop is described where pixels 500, 510, 520 are shifted to the left.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments. In various embodiments, disclosed methods and systems may comprise software executed within the cloud. For example, a user may access the software through a web browser. In additional or alternative embodiments, the software is executed locally at a device. For example, the software may be executed on a mobile computing device such as a smart phone or tablet.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Many computers are intended to be used by direct user interaction with the computer. As such, computers have input hardware and software user interfaces to facilitate user interaction. For example, a modern general-purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RANI and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for automating a shifting of pixels within a video file, comprising:
    one or more processors; and
    one or more computer-readable media having stored thereon executable instructions that when executed by the one or more processors configure the computer system to perform at least the following:
        access, from memory, a digital video file, wherein the digital video file comprises information that corresponds to individual pixels within various frames of the digital video file;
        receive a first starting point through a user interface, wherein the first starting point is received through a user selection of a first beginning portion of a first video frame;
        receive a first ending point through the user interface, wherein the first ending point is received through a user selection of a second ending portion of a second video frame;
        create a first digital link between the first starting point and the first ending point, wherein the first digital link comprises:
            a first direction extending from the first starting point to the first ending point; and
            a first length between the first starting point and the first ending point;
        identify a first set of pixels that are:
            parallel to the first digital link,
            within a user-defined threshold distance from the first digital link, and
            extending from the first starting point to the first ending point; and
        shift the first set of pixels in the first direction.

2. The computer system of claim 1, wherein the first video frame and the second video frame are the same video frame.

3. The computer system of claim 1, wherein the first digital link extends across the first video frame and the second video frame, and the first video frame and the second video frame are different.

4. The computer system of claim 3, wherein the executable instructions include instructions that are executable to:
    select, from within the first video frame, a first set of pixels adjacent to the first digital link;
    shift the first set of pixels within the first video frame along a first portion of the first digital link;
    select, from within the second video frame, another set of pixels adjacent to the first digital link; and
    shift the other set of pixels within the second video frame along a second portion of the first digital link.

5. The computer system of claim 4, wherein shifting the first set of pixels occurs at a shifting rate that is faster than a frame rate associated with the first video frame and the second video frame.

6. The computer system of claim 1, wherein the executable instructions include instructions that are executable to:
    select a second set of pixels adjacent to a second digital link; and
    shift the second set of pixels in a second direction.

7. The computer system of claim 6, wherein shifting the first set of pixels comprises rendering in a loop the first set of pixels being shifted within the first video frame.

8. The computer system of claim 1, wherein the executable instructions include instructions that are executable to configure the computer system to:
    receive a second starting point through the user interface, wherein the second starting point is received through a first user selection of a second beginning portion of the first video frame;
    receive a second ending point through the user interface, wherein the second ending point is received through a second user selection of a second ending portion of the second video frame;

create a second digital link between the second starting point and the second ending point, wherein the second digital link comprises:
a second direction extending from the second starting point to the second ending point; and
a second length between the second starting point and the second ending point;
identify a second set of pixels that are:
parallel to the second digital link,
within the user-defined threshold distance from the second digital link, and
extending from the second starting point to the second ending point; and
shift the second set of pixels in the second direction.

9. The computer system of claim 8, wherein the first direction is different from the second direction.

10. The computer system of claim 8, wherein a first magnitude of the shifting of the first set of pixels is proportionally related to the first length and a second magnitude of the shifting of the second set of pixels is proportionally related to the second length.

11. A method for automating a shifting of pixels within a video file, comprising:
receiving a first indication of a first starting point through a user interface, wherein the first starting point is received through a user selection of a first portion of a first video frame in the video file;
receiving, through the user interface, a first direction associated with the first starting point;
create a first digital link extending in the first direction from the first starting point;
selecting a first set of pixels that are:
parallel to the first digital link,
within a user-defined threshold distance from the first digital link, and
extending from the first starting point to a first ending point; and
shifting the first set of pixels, in the first video frame, in the first direction.

12. The method as recited in claim 11, further comprising receiving an indication to generate a first mask over a second portion of the first video frame, wherein pixels under the first mask are prevented from shifting.

13. The method as recited in claim 12, further comprising receiving through the user interface a selection of the second portion of the first video frame around which the first mask should be generated.

14. The method of claim 13, further comprising:
identifying one or more edges that form a first boundary around the second portion; and
generating the first mask to cover area within the first boundary.

15. The method as recited in claim 12, further comprising:
mapping the second portion of the first video frame to an equivalent portion in a second video frame;
identifying one or more edges that form a second boundary around the second portion; and
generating a second mask to cover area within the second boundary.

16. The method as recited in claim 15, further comprising:
receiving a second indication of the first ending point through the user interface, wherein the first ending point is received through a user selection of a particular portion of the second video frame;
create the first digital link between the first starting point and the first ending point;
selecting, within the second video frame, a second set of pixels adjacent to the first digital link and extending towards the first ending point; and
shifting the second set of pixels towards the first ending point.

17. The method as recited in claim 16, wherein pixels within the second video frame that are covered by the second mask are prevented from shifting.

18. A method for automating a shifting of pixels within a video file, comprising:
accessing, from memory, a digital video file, wherein the digital video file comprises information that corresponds to individual pixels within various frames of the digital video file;
receiving a first starting point through a user interface, wherein the first starting point is received through a first user selection of a first beginning portion of a first video frame;
receiving a first ending point through the user interface, wherein the first ending point is received through a second user selection of a second ending portion of a second video frame;
creating a first digital link between the first starting point and the first ending point, wherein the first digital link comprises:
a first direction extending from the first starting point to the first ending point; and
a first length between the first starting point and the first ending point; identifying a first set of pixels that are:
parallel to a second digital link,
within a user-defined threshold distance from the second digital link, and
extending from a second starting point to a second ending point; and
shifting the first set of pixels in the first direction.

19. The method of claim 18, wherein the first digital link extends across the first video frame and the second video frame, and the first video frame and the second video frame are different.

20. The method of claim 19, further comprising:
selecting, from within the first video frame, the first set of pixels adjacent to the first digital link;
shifting the first set of pixels within the first video frame along a first portion of the first digital link;
selecting, from within the second video frame, another set of pixels adjacent to the first digital link; and
shifting the other set of pixels within the second video frame along a second portion of the first digital link.

* * * * *